United States Patent
Kadiyala et al.

(10) Patent No.: US 11,681,817 B2
(45) Date of Patent: Jun. 20, 2023

(54) SYSTEM AND METHOD FOR IMPLEMENTING ATTRIBUTE CLASSIFICATION FOR PII DATA

(71) Applicant: JPMorgan Chase Bank, N.A., New York, NY (US)

(72) Inventors: Vijaya Kadiyala, Hyderabad (IN); Anil Kumar Gannamani, Hyderabad (IN); Swarna Bhagath Irukulla, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 553 days.

(21) Appl. No.: 16/582,318

(22) Filed: Sep. 25, 2019

(65) Prior Publication Data

US 2021/0089667 A1    Mar. 25, 2021

(51) Int. Cl.
  *G06F 21/62*    (2013.01)
  *G06F 40/10*    (2020.01)
  *G06F 40/205*   (2020.01)
  *G06F 40/284*   (2020.01)

(52) U.S. Cl.
  CPC ...... *G06F 21/6209* (2013.01); *G06F 21/6245* (2013.01); *G06F 40/10* (2020.01); *G06F 40/205* (2020.01); *G06F 40/284* (2020.01)

(58) Field of Classification Search
  CPC ........ G06F 40/10; G06F 40/20; G06F 40/205; G06F 40/284; G06F 21/6209; G06F 21/6245
  See application file for complete search history.

(56) References Cited

U.S. PATENT DOCUMENTS

| | | | | |
|---|---|---|---|---|
| 7,603,317 | B2 * | 10/2009 | Adler | G06F 21/6245 705/57 |
| 2003/0004966 | A1 * | 1/2003 | Bolle | G06F 16/685 707/E17.103 |
| 2005/0289340 | A1 * | 12/2005 | Camenisch | G06F 21/6245 713/165 |
| 2019/0354718 | A1 * | 11/2019 | Chandnani | G06F 21/6254 |
| 2020/0050966 | A1 * | 2/2020 | Enuka | G06F 21/6245 |
| 2020/0233977 | A1 * | 7/2020 | Chickerur | G06F 21/6254 |
| 2020/0320406 | A1 * | 10/2020 | Antonatos | G06F 21/6245 |
| 2021/0026985 | A1 * | 1/2021 | Rind | G06F 21/6254 |
| 2021/0092224 | A1 * | 3/2021 | Rule | G10L 15/22 |

* cited by examiner

*Primary Examiner* — Chau T Nguyen
(74) *Attorney, Agent, or Firm* — Greenblum & Bernstein, P.L.C.

(57) ABSTRACT

An embodiment of the present invention is directed to classifying attributes into respective PI/PG categories based on metadata. An embodiment of the present invention may classify each attribute into PII/Non-PII and then into various Protection group codes that define access, roles permissions, privileges and/or other action. An embodiment of the present invention may leverage various statistical techniques, natural language processing (NLP) methods and different combinations of algorithms customized to improve prediction accuracies of a classifier model.

20 Claims, 3 Drawing Sheets

SYSTEM AND METHOD FOR IMPLEMENTING ATTRIBUTE CLASSIFICATION FOR PII DATA

FIELD OF THE INVENTION

The invention relates generally to a system and method for implementing a data classification technique using machine learning and metadata to categorize personally identifiable information (PII) data.

BACKGROUND OF THE INVENTION

Personally identifiable information (PII) generally refers to any data that could potentially be used to identify a person. This may include full name, social security number, driver's license number, bank account number, passport number, email address, etc. Access to PII data must be controlled and based on business and regulatory compliance requirements. The security classification of the data must be considered when granting access to anyone. Accessing data is a balancing act between ready availability of all kinds of information, and the protection of sensitive or confidential information within that data. Through the implementation and governance of stringent access and security standards, data consumers should have controlled access to data as required and documented.

The current process is a rules based engine which works on exact keyword match/partial match to classify the attributes into respective PI/PG categories. In addition, the current process needs to be a constantly updated manually as it needs to include new keywords as and when they are encountered. Current solutions require extensive manual input and substantial resources.

These and other drawbacks exist.

SUMMARY OF THE INVENTION

According to one embodiment, the invention relates to a system that performs data classification for personally identifiable information (PII) data. The system comprises: a database that stores attribute data and corresponding metadata; an interactive user interface configured to receive user input via a communication network; and a computer processor, coupled to the database system and the communication network, configured to perform the steps of: receiving data relating to one or more attributes; identifying corresponding metadata associated with the one or more attributes; and classifying the one or more attributes into non-PII data and PII data based on the identified corresponding metadata and further classifying the PII data into one of a plurality of protection groups, each protection group identifying access permissions; wherein the classifying is based on statistical techniques and natural language processing.

According to another embodiment, the invention relates to a method that performs data classification for personally identifiable information (PII) data. The method comprises the steps of: receiving data relating to one or more attributes; identifying corresponding metadata associated with the one or more attributes; and classifying the one or more attributes into non-PII data and PII data based on the identified corresponding metadata and further classifying the PII data into one of a plurality of protection groups, each protection group identifying access permissions; wherein the classifying is based on statistical techniques and natural language processing.

The system may include a specially programmed computer system comprising one or more computer processors, interactive interfaces, electronic storage devices, and networks. The computer implemented system and method described herein provide unique advantages to entities, organizations and other users, according to various embodiments of the invention. Information access is critical to improve the quality of decisions and to provide excellent service. An embodiment of the present invention is directed to making information easily accessible to business owners to enable them to make the decisions within the scope of their responsibilities. An embodiment of the present invention recognizes that caution must be exercised when making data widely available. The privacy of customers must be protected to limit the risk of corporate surveillance and non-compliance penalties. Therefore, it is essential that data access be managed at a granular level, e.g., attribute level. In this way, the data stewards may control who gets access to what information on a "need to know" basis. An embodiment of the present invention recognizes that data needs to be available to business stakeholders as required for their job performance. For example, data related to customers of one business unit can be used in developing marketing or product strategies for another business area. As another example, performance data from one production facility might be needed by other production facilities to aid new facility planning. An embodiment of the present invention is directed to accurately and efficiently classifying attributes based on metadata so that personally identifiable information will be held to an appropriate level of security to prevent unauthorized access or use.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
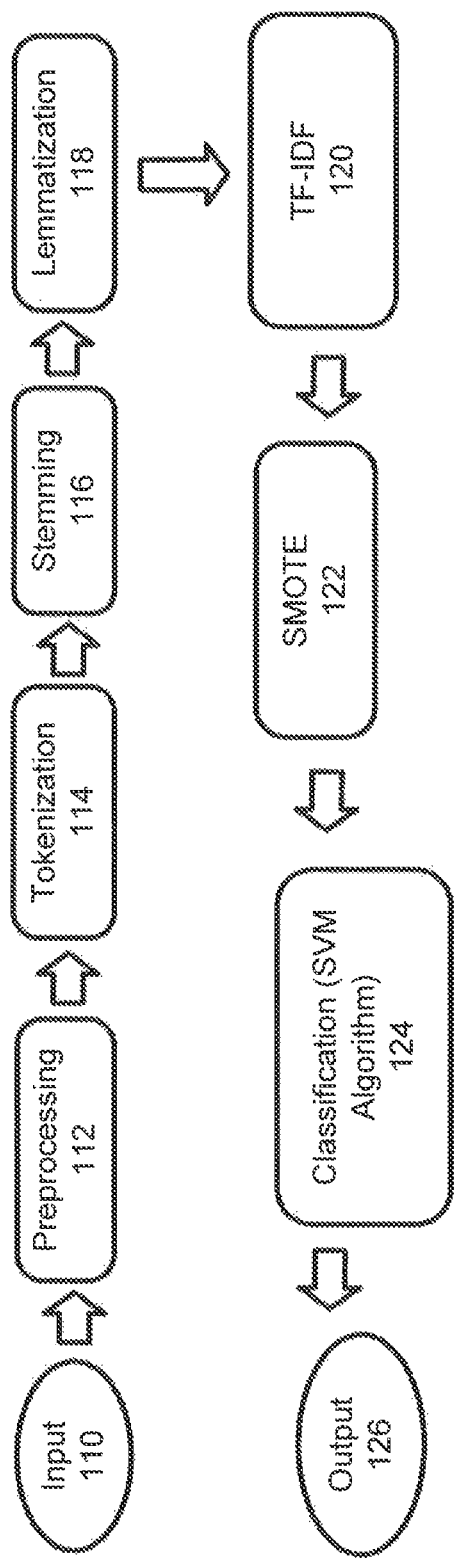
FIG. 1 illustrates an exemplary flowchart for data classification of PII data, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a centralized automated system that classifies attributes into respective PI/PG categories. Attributes may include customer name, social security number, phone number, date of birth, etc. An embodiment of the present invention leverages metadata information about the attributes, such as Table Logical Name, Table Physical Name, Attribute/Column logical name, Attribute/Column physical name and Attribute/Column definition. For example, "Table Logical Name" may include monthly card services customer high risk exposure summary; "Table Physical Name" may include MO_CDSVC_CUST_HIGH_RISK_EXP_SUM; "Column Logical Name" may include prior year credit bureau portfolio valid score; "Column Physical Name" may include PRI_YR_CR_BR_PORT_VAL_SC; "Column Definition" may indicate that the degree of risk of a consumer as measured by cycles of delinquent or other behavior. An embodiment of the present invention appreciates various models where (i) most of the details about an attribute are known and (ii) only table and attribute physical names are known.

A framework of an embodiment of the present invention may first classify each attribute into PII/Non-PII and then into various Protection group codes, such as Authenticators (e.g., passwords, PINs, security keys, etc.), Confidential (e.g., audit reports, intellectual property, source code, etc.), Confidential PI (e.g., account number, merchant/payee account number, financial transactions, etc.), Government Identifiers (e.g., social security, student ID, veterans ID, passport, tax ID, etc.), High Confidential (e.g., security incidents, mergers, acquisitions, etc.), High Confidential PI (e.g., credit/debit card number, check image, HIPAA, etc.), Accessible to Internal Users (e.g., internal data, workforce, network domain addresses, IP addresses etc.), PI Direct Identifiers (e.g., non-firm domain email addresses, employee/personal addresses, client addresses, third party addresses, etc.), and Risk Scores (e.g., credit bureau, risk data, etc.). Protection group codes may vary from 4 categories to 9 categories, for example. Additional categories and/or subcategories may be applied. An embodiment of the present invention may leverage various statistical techniques, natural language processing (NLP) methods and different combinations of algorithms customized to improve prediction accuracies of a classifier model. According to an embodiment of the present invention, input data may be consumed by a self-servicing UI/Microservice using REST API which once invoked may automatically classify each attribute to a respective PI (Personal Information)/PG (Protection Group) category.

An embodiment of the present invention is directed to an automated attribute classification system and method that manages and organizes PI and PG information that is widespread and continuously increasing. Text classification may be applied in information extraction and summarization, text retrieval, and question-answering. An embodiment of the present invention is directed to a text classification process for PII and PG categories using Natural language Processing (NLP) and Machine Learning (ML) techniques.

Enormous data sets are being fed in to Hadoop day in and day out. In Teradata, Protection Group classification of each attribute may be taken at the database level through grants at the time of table creation. In Hadoop, Protection Group classification may be applied to zones in Hadoop where data consumption or data exposure to business is expected. An embodiment of the present invention recognizes that unauthorized data access may be prevented by assigning Protection Group code to each element of data accurately. Depending on Protection Group Categories, data access may be restricted pursuant to defined roles, permissions, access, etc.

FIG. 1 illustrates an exemplary flowchart for data classification of PII data, according to an embodiment of the present invention. An embodiment of the present invention is directed to a centralized system and method that automatically classifies attributes into respective PI/PG categories. At step 110, data may be received as input. At step 112, pre-processing may be applied. At step 114, tokenization may be applied. At step 116, a stemming process may be initiated, followed by a grouping process (e.g., lemmatization process) at step 118. At step 120, a weighting technique (e.g., TF-IDF) may be applied. At step 122, a statistical technique (e.g., SMOTE) may be applied. At step 124, classification process may be initiated, where an output is provided at 126. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 112, pre-processing may be applied. Data preprocessing may represent a data mining technique that involves transforming raw data into an understandable format. Real-world data is often incomplete, inconsistent, and/or lacking in certain behaviors or trends, and is likely to contain many errors. Data preprocessing may resolve and address such issues. For example, Data preprocessing may prepare raw data for further processing, such as Data Cleaning, Data Integration, Data Transformation, Data Reduction and Data Discretization.

Data Cleaning may involve cleaning data through processes such as filling in missing values, smoothing the noisy data, and/or resolving the inconsistencies in the data. With Data Integration, data with different representations may be combined or put together where conflicts within the data are resolved. With Data Transformation, data may be normalized, aggregated and generalized. Data Reduction aims to present a reduced representation of the data in a data warehouse. Data Discretization may involve the reduction of a number of values of a continuous attribute by dividing the range of attribute intervals.

At step 114, tokenization may be applied. Tokenization may involve breaking up a sequence of strings into pieces such as words, keywords, phrases, symbols and/or other elements. Tokens may represent individual words, phrases as well as whole sentences. In the process of tokenization, some characters, e.g., punctuation marks, may be discarded. The tokens may become an input for another process, such as parsing, text mining, etc.

According to an exemplary application, tokenization may rely mostly on simple heuristics in order to separate tokens by following a few exemplary steps: tokens or words may be separated by whitespace, punctuation marks or line breaks; white space or punctuation marks may or may not be included depending on the need; characters within contiguous strings are part of the token; tokens may be made up of alpha characters, alphanumeric characters and/or numeric characters; and tokens themselves may also be separators. For example, in most programming languages, identifiers may be placed together with arithmetic operators without white spaces. Although it seems that this would appear as a single word or token, the grammar of the language may consider the mathematical operator (a token) as a separator, so even when multiple tokens are bunched up together, they may still be separated via the mathematical operator.

At step 116, a stemming process may be initiated, followed by a grouping process (e.g., lemmatization process) at step 118. In linguistic morphology and information retrieval, stemming may represent a process for reducing inflected (or sometimes derived) words to their stem, base or root form—generally a written word form. The stem need not be identical to the morphological root of the word; it is usually sufficient that related words map to the same stem, even if this stem is not in itself a valid root.

Lemmatization (or lemmatization) may represent a process of grouping together different inflected forms of a word so they may be analyzed as a single item. For example, lemmatization may represent an algorithmic process of determining the lemma for a given word. Since the process may involve complex tasks such as understanding context and determining the part of speech of a word in a sentence (requiring, for example, knowledge of the grammar of a language), it may be a hard task to implement a lemmatizer for a new language. In many languages, words appear in several inflected forms. For example, in English, the verb 'to walk' may appear as 'walk', 'walked', 'walks', 'walking'. The base form, 'walk', that one might look up in a dictionary, is called the lemma for the word. The combination of the base form with the part of speech is often called the lexeme of the word. Lemmatization is closely related to stemming. A difference is that a stemmer operates on a single word without knowledge of the context, and therefore cannot discriminate between words which have different meanings depending on part of speech. Other types of language processing techniques may be applied, in accordance with the various embodiments of the present invention.

At step 120, a weighting technique (e.g., TF-IDF) may be applied. Term frequency-inverse document frequency (TF-DF) weight may represent a weight used in information retrieval and text mining. This weight may represent a statistical measure that evaluates how important a word is to a document in a collection or corpus. The importance increases proportionally to the number of times a word appears in the document but may be offset by a frequency of the word in the corpus.

According to an exemplary embodiment, a ranking function may be computed by summing the TF-IDF for each query term. In addition, TF-IDF may be used for stop-words filtering in various subject fields including text summarization and classification.

According to an exemplary embodiment, TF-IDF weight may include two terms. A first term may compute a normalized Term Frequency (TF), the number of times a word appears in a document, divided by the total number of words in that document. A second term may represent an Inverse Document Frequency (IDF), computed as a logarithm of the number of the documents in the corpus divided by the number of documents where the specific term appears.

Term Frequency (TF) may measure how frequently a term occurs in a document. Since every document is different in length, it is possible that a term would appear much more times in long documents than shorter ones. Thus, the term frequency may be divided by the document length (e.g., total number of terms in the document) as a way of normalization. An exemplary computation may be represented by the following:

$$TF(t)=(\text{Number of times term } t \text{ appears in a document})/(\text{Total number of terms in the document}).$$

Inverse Document Frequency (IDF) may measure how important a term is. While computing TF, all terms are considered equally important. However, certain terms, such as "is", "of", and "that", may appear many times but have little importance. Thus, an embodiment of the present invention may weigh down the frequent terms while scaling up the rare ones. An exemplary computation may be represented by the following:

$$IDF(t)=\log\_e(\text{Total number of documents/Number of documents with term } t \text{ in it}).$$

At step 122, a statistical technique (e.g., Synthetic Minority Oversampling Technique (SMOTE)) may be applied. SMOTE may represent a statistical technique for increasing the number of cases in a dataset in a balanced way. A corresponding module may generate new instances from existing minority cases that an input is supplied. This implementation of SMOTE does not change the number of majority cases.

For example, new instances are not just copies of existing minority cases; instead, the algorithm may take samples of the feature space for each target class and its nearest neighbors, and generate new examples that combine features of the target case with features of its neighbors. Accordingly, this approach increases the features available to each class and makes the samples more general.

According to an exemplary illustration, SMOTE may take an entire dataset as an input, but then increase the percentage of only the minority cases. For example, an imbalanced dataset may have just 1% of the cases with a target value A (the minority class), and 99% of the cases with a value B. To increase the percentage of minority cases to twice the previous percentage, a SMOTE percentage may be set to 200 in the module's properties.

At step 124, a text classification process may be initiated, where an output is provided at 126. A Text Classification (e.g., Support Vector Machine (SVM) algorithm) may represent a supervised machine learning algorithm that may perform classification and regression challenges. SVM represents a discriminative classifier defined by a hyperplane. The hyperplane distinctly classifies data points.

Figure 2:
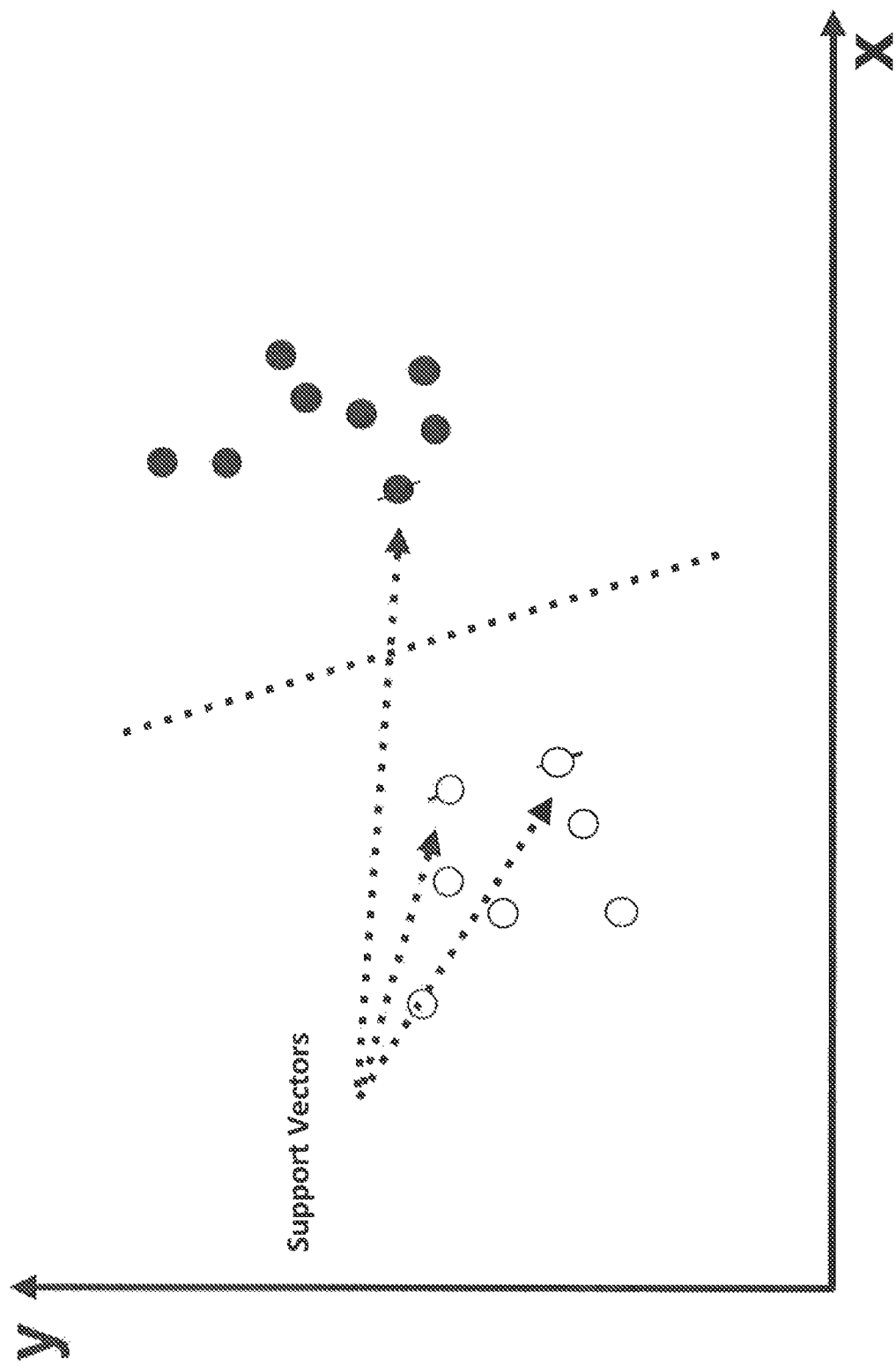
FIG. 2 is an exemplary illustration of support vectors, according to an embodiment of the present invention.

FIG. 2 is an exemplary illustration of support vectors, according to an embodiment of the present invention. FIG. 2 illustrates a SVM algorithm. In this exemplary algorithm, each data item may be plotted as a point in n-dimensional space (where n is a number of features) with the value of each feature being the value of a particular coordinate. Classification may be applied to find a hyper-plane that differentiates the two classes.

Figure 3:
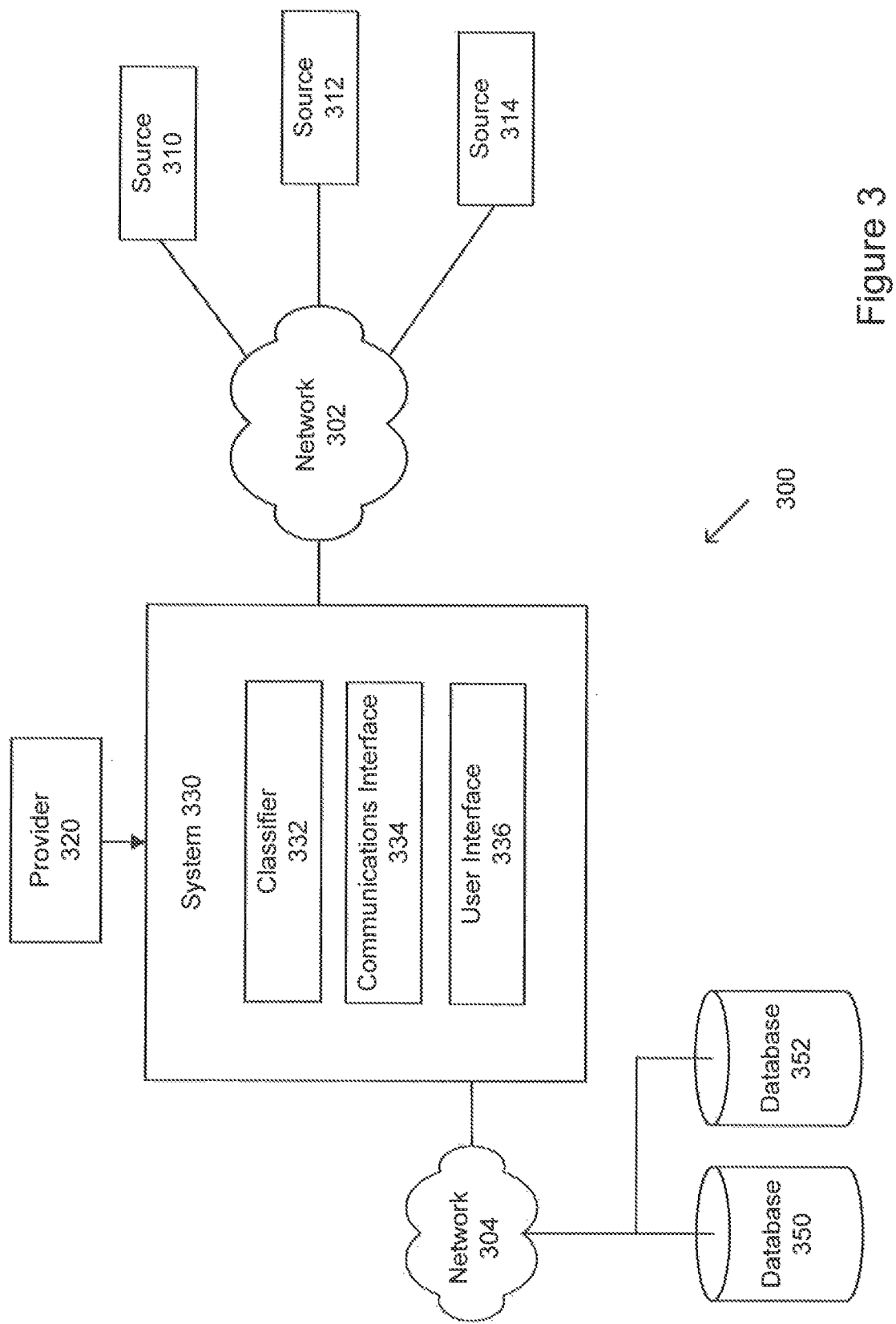
FIG. 3 illustrates a system that implements data classification of PII data, according to an embodiment of the present invention.

FIG. 3 illustrates a system that implements data classification of PII data, according to an embodiment of the present invention. As shown in FIG. 3, System 300 includes processing components, modules and functions. Server 330 may receive input data from various Sources represented by 310, 312 and 314. Sources may be internal as well as external to an entity. According to an exemplary implementation, System 330 may include Classifier 332, Communications Interface 334 and User Interface 336 and various networking and communication components. Other functions and services may be supported. The components illustrated in FIG. 3 are merely exemplary, other devices may be represented in various applications. While a single component is illustrated, each component may represent multiple components.

Classifier 332 may classify attributes into respective PI/PG categories based on metadata. For example, metadata about the attributes may include: Table Physical Name, Table Logical Name, Attribute logical name, Attribute physical name and Attribute definition. An embodiment of the present invention may classify each attribute into PII/Non-PII and then into various Protection group codes that define access, roles permissions, privileges and/or other action. An embodiment of the present invention may leverage various statistical techniques, natural language processing (NLP) methods and different combinations of algorithms customized to improve prediction accuracies of a classifier model. For example, an embodiment of the present invention may apply a text classification process for PII and PG categories using Natural language Processing (NLP) and Machine Learning (ML) techniques.

Communications Interface 334 may manage inputs from various sources, including requests, etc. Network 302, 304 may be communicatively coupled with various components in a network. System 330 may communicate with various users, using any mobile or computing device, such as a laptop computer, a personal digital assistant, a smartphone, a smartwatch, smart glasses, other wearables or other computing devices capable of sending or receiving network signals.

User Interface 336 may interact with various users and provide attribute analysis and corresponding metadata. In addition, output data may be organized in various formats, including reports, tables, etc.

System 330 may be hosted by a financial institution or other entity represented by Provider 320. Other scenarios and architectures may be implemented.

System 330 may store and access data from various database components, including Database 350 and 352. For example, Databases may store and manage metadata, attributes, etc. Databases may be internal or external to Server 330. Data may be stored and managed in storage components, represented by Database 350, via Network 304. Server 330 may be communicatively coupled to Databases, represented by 350 and 352. Databases may include any suitable data structure to maintain the information and allow access and retrieval of the information. The storage may be local, remote, or a combination thereof with respect to Databases. Communications with Databases may be over a network, or communications may involve a direct connection between Databases and System 330, as depicted in FIG. 3. Databases may also represent cloud or other network based storage.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

Network 302, 304 may be a wireless network, a wired network or any combination of wireless network and wired network. Although Network 302, 304 is depicted as one network for simplicity, it should be appreciated that according to one or more embodiments, Network 302, 304 may comprise a plurality of interconnected networks, such as, for example, a service provider network, the Internet, a cellular network, corporate networks, or even home networks, or any of the types of networks mentioned above. Data may be transmitted and received via Network 302, 304 utilizing a standard networking protocol or a standard telecommunications protocol.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that performs data classification for personally identifiable information (PII) data, the system comprising:

a database system that stores attribute data and corresponding metadata;

an interactive user interface configured to receive user input via a communication network; and a computer processor, coupled to the database system and the communication network, configured to:

create machine learning algorithms;

define at least one of the machine learning algorithms by a hyperplane that distinctly classifies one or more data points;

receive data relating to one or more attributes of the attribute data;

apply tokenization to the data relating to the one or more attributes of the attribute data, to identify a sequence of words;

apply, to the data relating to the one or more attributes of the attribute data, a weighting technique that represents an importance associated with a word;

identify corresponding metadata associated with the data relating to the one or more attributes of the attribute data, wherein the identified corresponding metadata includes values determined by the applying the weighting technique; and classify the data relating to the one or more attributes of the attribute data into non-PII data and the PII data based on the identified corresponding metadata and further classifying the PII data into one of a plurality of protection groups, each protection group identifying access permissions, wherein the classify is based on statistical techniques, the machine learning algorithms, and natural language processing.

2. The system of claim 1, wherein the computer processor is configured to:

apply a stemming process to the data relating to the one or more attributes of the attribute data, to reduce inflected words to a stem form.

3. The system of claim 1, wherein the computer processor is configured to:

apply a grouping of words as a single item.

4. The system of claim 3, wherein the grouping comprises a lemmatization process.

5. The system of claim 1, wherein the weighting technique comprises term frequency-inverse document frequency (TF-IDF) weight.

6. The system of claim 5, wherein the term frequency-inverse document frequency (TF-IDF) weight comprises a first term that measures how frequently a term appears in a document.

7. The system of claim 6, wherein the term frequency-inverse document frequency (TF-IDF) weight comprises a second term that measures how important a term is.

8. The system of claim 1, wherein the computer processor is configured to: apply a Synthetic Minority Oversampling Technique to increase a dataset in a balanced manner.

9. The system of claim 1, wherein the computer processor is further configured to: plot the data relating to the one or more attributes of the attribute data as the one or more data points in the hyperplane, wherein each feature of an attribute of the one or more attributes of the attribute data has a one-to-one correspondence with each dimension in the hyperplane.

10. The system of claim 1, wherein the interactive user interface is a microservice that is further configured to: utilize REST API to consume the user input by providing, to the computer processor, the user input as the data relating to the one or more attributes of the attribute data.

11. A method that performs data classification for personally identifiable information (PII) data, the method comprising:
- storing attribute data and corresponding metadata
- creating machine learning algorithms;
- defining at least one of the machine learning algorithms by a hyperplane that distinctly classifies one or more data points;
- receiving data relating to one or more attributes of the attribute data;
- applying tokenization to the data relating to the one or more attributes of the attribute data, to identify a sequence of words;
- applying, to the data relating to the one or more attributes of the attribute data, a weighting technique that represents an importance associated with a word;
- identifying corresponding metadata associated with the data relating to the one or more attributes of the attribute data, wherein the identified corresponding metadata includes values determined by the applying the weighting technique; and
- classifying the data relating to the one or more attributes of the attribute data into non-PII data and the PII data based on the identified corresponding metadata and further classifying the PII data into one of a plurality of protection groups, each protection group identifying access permissions,
- wherein the classifying is based on statistical techniques, the machine learning algorithms, and natural language processing.

12. The method of claim 11, further comprising:
applying a stemming process to the data relating to the one or more attributes of the attribute data, to reduce inflected words to a stem form.

13. The method of claim 11, further comprising:
applying a grouping of words as a single item.

14. The method of claim 13, wherein the grouping comprises a lemmatization process.

15. The method of claim 11, wherein the weighting technique comprises term frequency-inverse document frequency (TF-IDF) weight.

16. The method of claim 15, wherein the term frequency-inverse document frequency (TF-IDF) weight comprises a first term that measures how frequently a term appears in a document.

17. The method of claim 16, wherein the term frequency-inverse document frequency (TF-IDF) weight comprises a second term that measures how important a term is.

18. The method of claim 11, further comprising: applying a Synthetic Minority Oversampling Technique to increase a dataset in a balanced manner.

19. The method of claim 11, further comprising: plotting the data relating to the one or more attributes of the attribute data as the one or more data points in the hyperplane, wherein each feature of an attribute of the one or more attributes of the attribute data has a one-to-one correspondence with each dimension in the hyperplane.

20. The method of claim 11, further comprising: utilizing, by an interactive user interface that is a microservice, REST API to consume the user input by providing, to a computer processor, the user input as the data relating to the one or more attributes of the attribute data.

* * * * *